Figure 1:
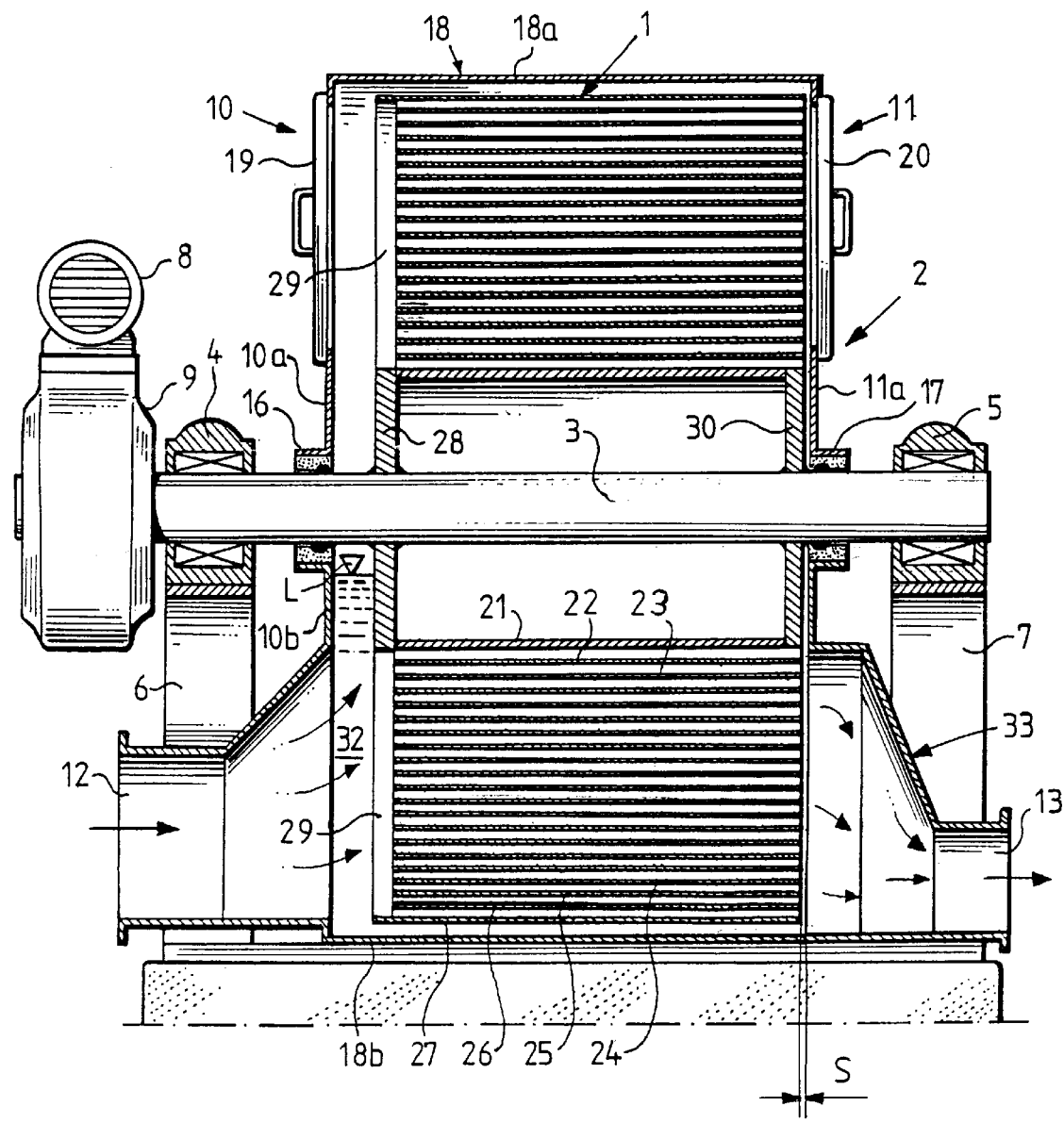

United States Patent
Strid et al.

[11] Patent Number: 5,935,053
[45] Date of Patent: Aug. 10, 1999

[54] FRACTIONATOR

[75] Inventors: Kent Strid, Järbo; Rolf Oswaldson, Gävle, both of Sweden

[73] Assignee: Kvaerner Pulping AS, Norway

[21] Appl. No.: 08/913,092

[22] PCT Filed: Mar. 6, 1996

[86] PCT No.: PCT/SE96/00297

§ 371 Date: Nov. 24, 1997

§ 102(e) Date: Nov. 24, 1997

[87] PCT Pub. No.: WO96/28608

PCT Pub. Date: Sep. 19, 1996

[30] Foreign Application Priority Data

Mar. 10, 1995 [SE] Sweden ................................. 9500869

[51] Int. Cl.$^6$ ................................................ B04B 1/04
[52] U.S. Cl. .............................................. 494/66; 494/77
[58] Field of Search .................................. 209/664, 660, 209/659, 268, 270; 494/34, 44, 66, 77; 496/36; 210/497.05, 364, 380.1

[56] References Cited

U.S. PATENT DOCUMENTS

| 1,057,613 | 4/1913 | Baldwin | 494/44 X |
| 2,209,577 | 7/1940 | Podbielniak | 261/83 |
| 3,791,575 | 2/1974 | Lartinen et al. | 494/2 |
| 4,210,276 | 7/1980 | Lapshev et al. | 494/64 |

*Primary Examiner*—W. L. Walker
*Assistant Examiner*—Terry K. Cecil
*Attorney, Agent, or Firm*—Quarles & Brady

[57] ABSTRACT

A fractionator includes a shaft attached to a drum which is positioned in a housing and which is rotatable about a substantially horizontal axis and has an inlet means for suspension and at least two outlets for fractions. The drum has a first end and a second end and includes at least two fluid tight walls surrounding the axis. The drum also extends in its longitudinal direction between the first end and the second end to define a fluid channel. The fluid channel extrends substantially parallel to the axis from the first end to the second end and continuously in a circumferential direction of at least 360°.

10 Claims, 5 Drawing Sheets

FRACTIONATOR

The present invention concerns a fractionator for fractioning a suspension in at least two fractions, including a drum rotatable about a substantially horizontal shaft and having an inlet for suspension and at least one outlet for fractions, said drum including at least two walls curved about the shaft and extending substantially parallel thereto in the longitudinal direction thereof, said walls defining between them a fluid channel substantially parallel to the shaft.

Within the pulp industry there is a need to separate from certain filtrates particles accompanying the filtrate, for instance in the manufacture of recycled paper pulp. In one phase of this process, the recycled pulp is washed, which results in that particularly fillers, such as clay and ash, printing ink and so-called fines are washed out of the pulp in a filtering process, which aims at retaining mainly long fibres. However, it is unavoidable that also long fibres accompany the filtrate, which, thus, will contain long fibres, fines, fillers and printing ink. It is, of course, desirable to be able to recover not only the valuable long fibres, but also fines and fillers, of which particularly the latter are valuable and are needed in papermaking. Besides, for environmental reasons it is favourable if also the finest particles can be recovered and recycled.

In order to separate particles of different sizes in a liquid, it is known to utilize a so-called fractionator. A known such fractionator utilizes a rotatable cylindrical drum, which is internally provided with a helical or spiral channel. This channel has a centrally located entrance and an exit located at the periphery of the drum. The suspension to be fractionated is introduced at the centre of the drum, and the drum is rotated so that the entrance end of the helical channel is filled like a scoop with suspension at each revolution. Between two adjacent channel walls, thus, there will be a suspension plug moving outwards towards the outer loop of the helix and the exit of the channel. Thus, between the channel walls and the suspension plug there will take place a relative movement. As is known from the science of flow this results in that larger particles will gather at the front end of the plug, whereas gradually smaller particles will gather gradually further backwards in the plug, all as counted in its relative direction of movement. Seen in the direction of rotation of the drum, thus, the smallest particles are located foremost and the largest last in the plug. Beneath the drum there are two or more collecting means, which are located in a row after and against each other in the rotational direction of the drum. When a suspension plug is situated in the last turn of the helical channel, the entire plug leaves the exit of the channel in a substantially coherent state when the exit moves over and past the collecting means, the plug falling down towards the collecting means. Thus, in the first collecting means, as counted in the direction of rotation of the drum, the largest particles will be caught, while the smallest will be caught in the last collecting means.

This known fractionator has an inherent drawback in that it operates intermittently, since feeding of suspension and discharge of fractions occurs but once a revolution. Further, the fractioning distance, i.e., the relative flow distance of the suspension, and, accordingly, the fractioning time is determined by the length of the helical channel.

In a not pre-published solution (SE-9303193-8) of the problems associated with this known fractionator, a fractionator is suggested including a drum rotatable about a substantially horizontal axis and having axially spaced end walls. From an inlet centrally located in one end wall of the drum, a flow channel extends forth and back between the end walls and radially outwards towards outlet means for the at least two fractions in the other end of the drum. The flow channel is defined by substantially concentric cylindrical walls, of which every second in its one axial end is tightly connected to one end wall of the drum and every second in its one axial end is tightly connected to the other end wall of the drum, so that flow can take place between the respective other ends of the cylindrical walls and the one and the other end wall, respectively, of the drum.

This fractionator has proven to comply well with all expectations as concerns fractioning ability, but involves, of course, the drawback of a relatively complicated manufacture due to the cylindrical walls alternatingly attached to the one and the other end wall. Thus, a simplification of the mechanical construction would be desirable. In practical tests with this fractionator it has surprisingly appeared that fractioning is completed or at least sufficiently completed already after one passage between the end walls of the drum, i.e., from the inlet to the opposite end wall. Thus, further flow forth and back has proven to be at least practically unnecessary and, to some extent, to reduce capacity as well.

Consequently, since it has surprisingly proven possible with reasonable axial drum lengths to achieve a satisfactory fractioning merely by causing a suspension to perform one axial passage along the length of a drum, there is proposed, according to the present invention, a fractionator for fractioning a suspension in at least two fractions and including a drum rotatable about a substantially horizontal axis and having inlet for suspension and at least one outlet for fractions, which is characterized in that the drum includes at least two walls curved about the axis and extending substantially parallel thereto in the longitudinal direction thereof, said walls defining between them a fluid channel substantially parallel to the axis, and in that the inlet is provided in a first end of the drum and outlets for the at least two fractions in the other end of the drum.

The walls defining the flow channel may be coaxial cylinder walls or adjacent turns of a spirally curved wall.

Figure 2:
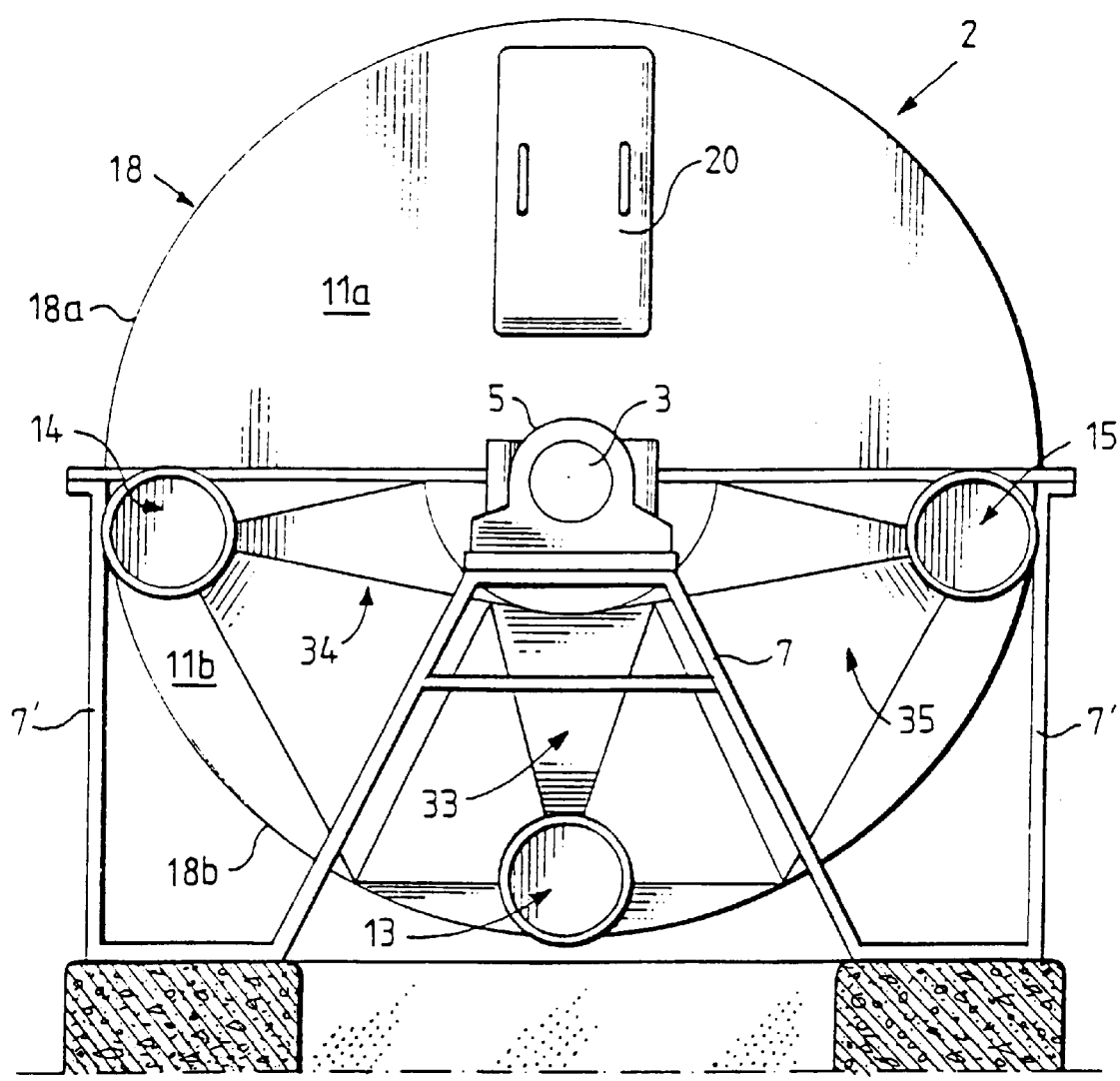
Figure 3:
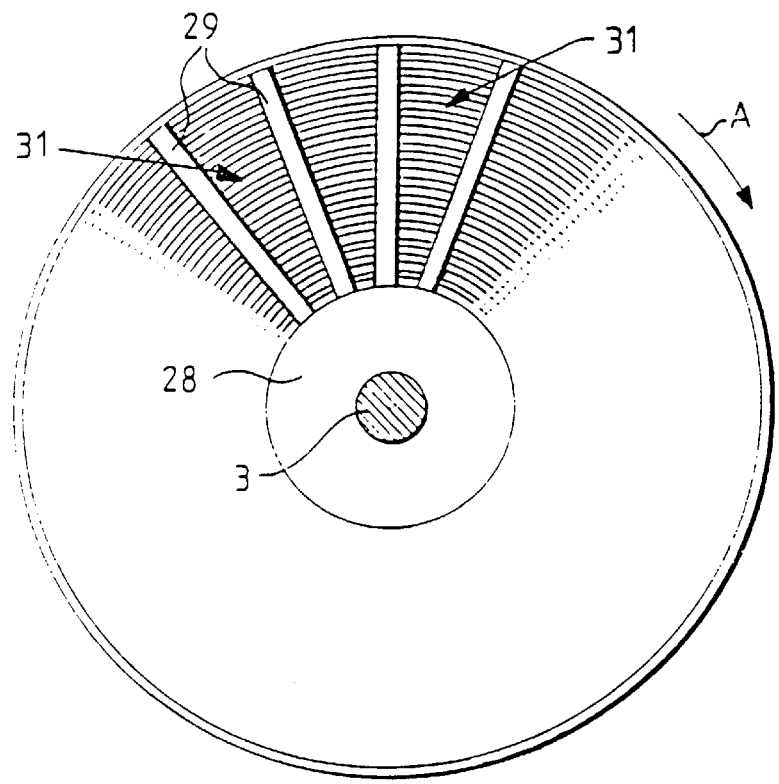
Figure 4:
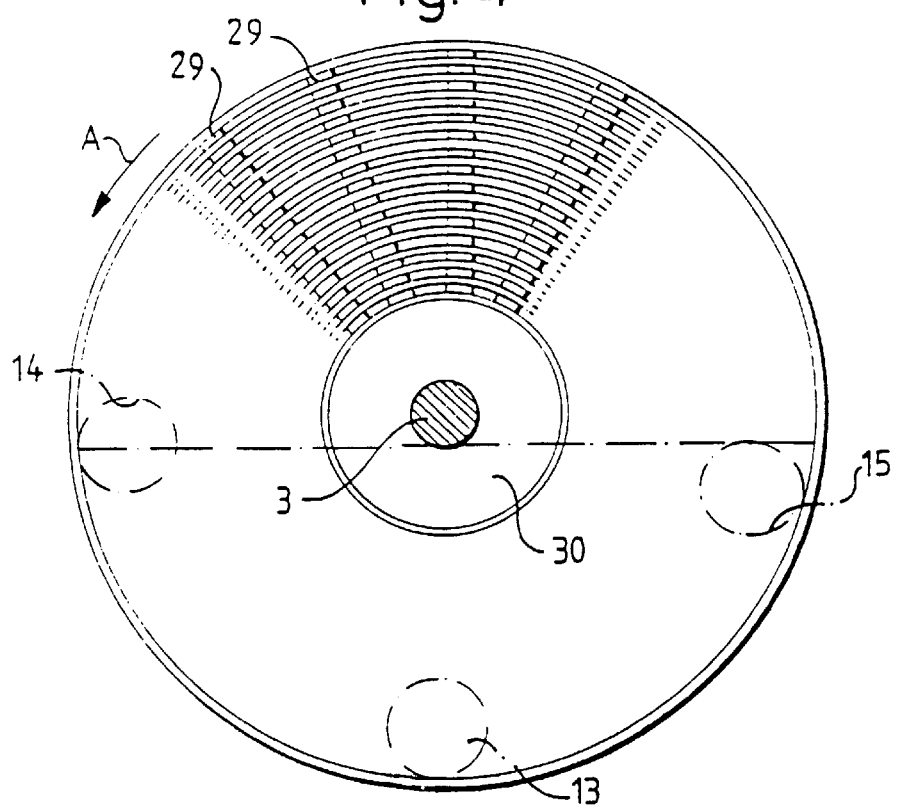
Figure 5:
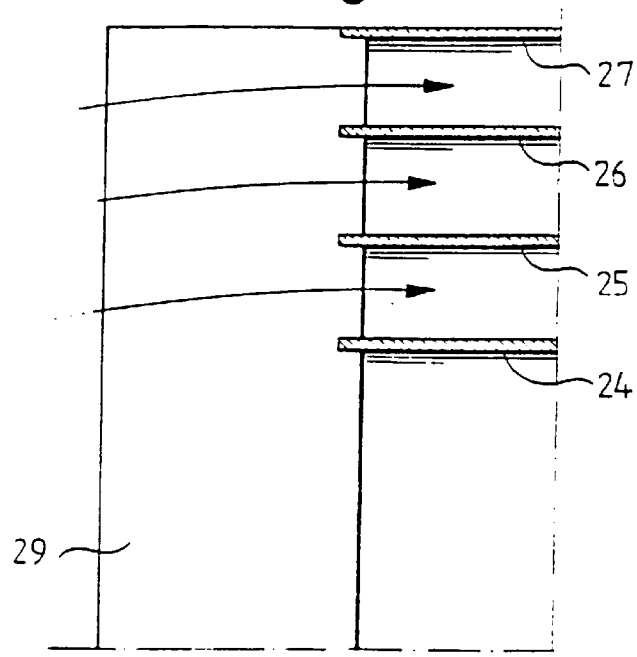
Figure 6:
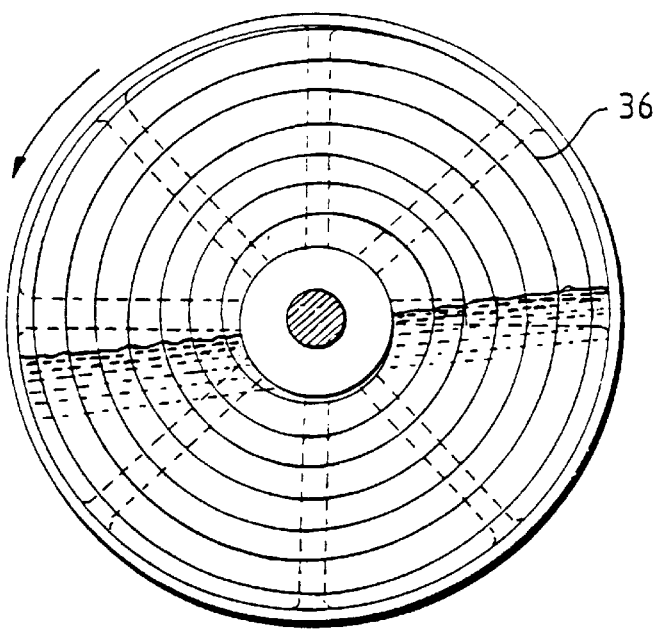
Figure 7:
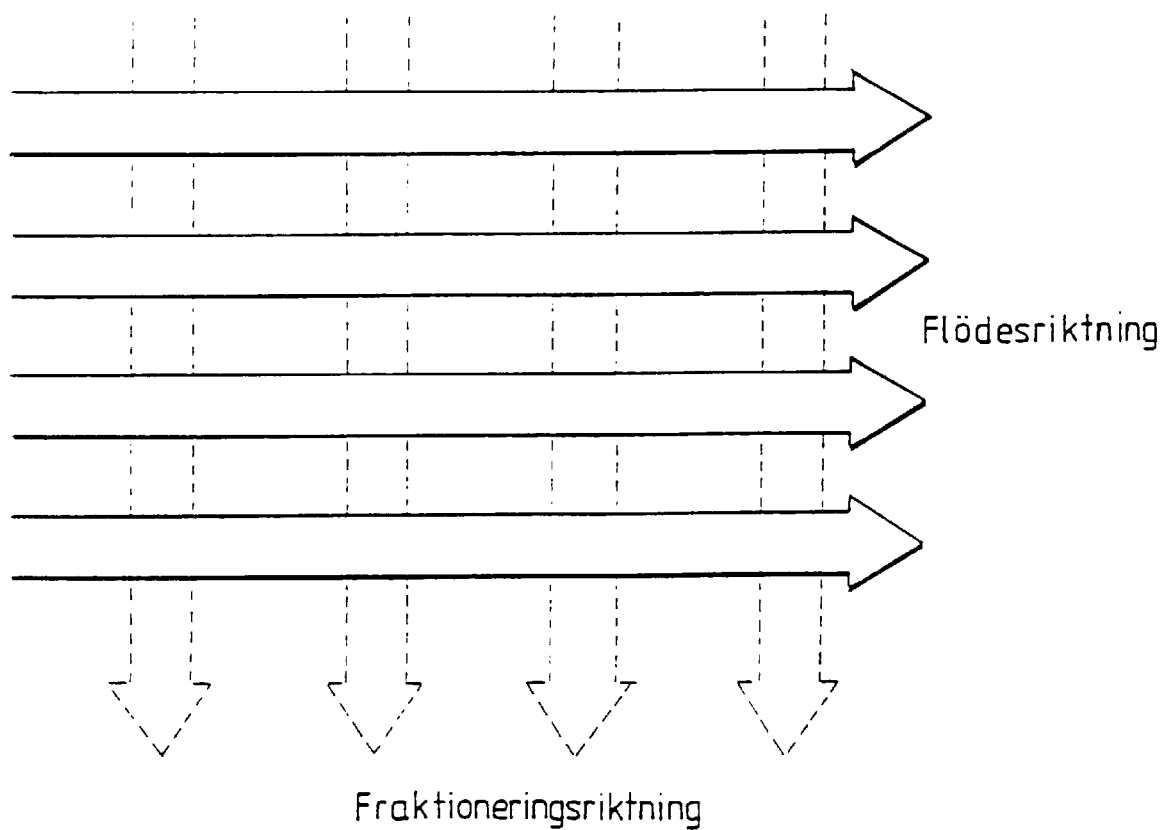

The invention will be described hereinafter, reference being made to an exemplifying embodiment shown on the attached drawings, wherein:

FIG. 1 is an axial section through a fractionator according to the present invention having a drum with coaxial cylinder walls or a spirally curved wall, FIG. 2 is an end view of a drum according to FIG. 1 seen from the outlet side, FIG. 3 is a view of a drum according to FIG. 1 having coaxial cylinder walls, seen from the inlet side, FIG. 4 is a view of a drum according to FIG. 1 having coaxial cylinder walls, seen from the outlet side, FIG. 5 is a view of a drum having spirally curved wall, seen from the outlet side, FIG. 6 is a part section at an enlarged scale through the upper left portion of a drum according to FIG. 1, and FIG. 7 shows the working principles of the fractionator according to the present invention.

The fractionator shown in FIGS. 1 and 2, which is adapted for fractioning a suspension in three fractions, includes a rotor in the shape of a fractioning drum 1 and a fractioning housing 2. The drum is rigidly supported by a substantially horizontal shaft 3 journalled in bearings 4, 5 axially outside the housing 2. The bearings are carried by a machine stand 6, 7. The shaft is driveable by means of a motor 8 and a reduction gear 9 driveably connected to the motor and the shaft, such that the drum may be rotated at a relatively low rotational speed, for instance 2,5–5, 5 rpm, typically 4 rpm.

The housing has parallel end walls 10 and 11, the wall 10 being provided with an inlet 12 for suspension and the wall 11 with outlets 13, 14 and 15 for three fractions.

The housing is liquid tight, at least up to the level of the shaft, where stuffing boxes 16, 17 seal between the shaft and the end walls 10 and 11.

The housing has a cylindrical casing 18, and this and the end walls 10 and 11 are divided along a horizontal diametrical plane through the shaft 3 in upper parts 18a and 10a, 11a, respectively, and lower parts 18b and 10b, 11b, respectively, such that an upper part of the housing in the shape of a cover is liftable from a lower part constituting a trough for suspension. In the parting plane, at least the parts of the cylindrical casing, but preferably also the end walls, are provided with outwardly directed flanges. In FIG. 2 is shown how the flanges of the cylindrical casing rest against an outer part 7' of the machine stand. In the end walls there are inspection hatches 19 and 20.

According to the present invention, the drum includes at least two walls curved about the shaft and extending substantially parallel in the longitudinal direction of the shaft, said walls defining between them a flow channel substantially parallel to the shaft. Between these walls suspension may flow from the inlet end of the drum to its outlet end. For practical and not the least capacity reasons, however, the fractioning drum according to the present invention consists of several parallel flow channels formed by either a plurality of concentric cylinder walls or a continuous wall curved in several spiral shaped turns.

In the example shown in FIG. 1, there are twenty-one such walls, thus two by two defining twenty flow channels parallel to the shaft. For the sake of clarity, in FIG. 1 only the three radially inner walls and the four radially outer walls have reference numerals, viz., 21, 22 and 23, and 24, 25, 26 and 27, respectively.

At the inlet side the radially inner channel wall 21 is tightly connected with (welded to) the peripheral region of a circular end plate 28 constituting a hub for a number of radially directed spokes 29. On the outlet side, the channel wall 21 could be terminated without support against the shaft, but it is preferred that it be also there tightly connected with (welded to) the periphery of a circular end plate 30. The end plates 28 and 30 are tightly and non-rotatably connected with (welded to) the shaft 3. The channel wall 21, that is shown to have a substantially greater material thickness than the remaining channel walls, forms, together with the end plates 28 and 30, a stiffening means for the shaft 3 against torsion as well as bending.

The channel walls 22, 23 . . . 24, 25, 26 and 27 are all connected to and supported by merely the spokes 29 at one of their ends. This end constitutes the inlet end of the flow channels extending between respective pairs of adjacent channel walls, and the inlet of the drum is constituted by the spaces 31 between adjacent spokes 29. At the opposite end, the channel walls 22 . . . 27, being of equal length in the axial direction, terminate entirely freely, so that the flow channels are entirely open at this end, their outlet end. Between the outlet end of the channels and the end wall 11 of the housing there is a little clearance S (e.g., 0,5–1 mm).

In operation of the fractionator according to the present invention, suspension is introduced through the inlet 12 into the housing to a space 32 between the end wall 10 and the inlet end of the drum, i.e., the spokes 29 and the end plate 28. The suspension flow is adjusted so that the level L at the inlet side of the drum, i.e., in the space 32, reaches up above the radially inner channel wall 21, e.g., just below the shaft 3. The suspension will now flow in through the inlet spaces 31 between the spokes 29 and purely axially along the flow channels formed by pairs of adjacent channel walls 21–22, 22–23, . . . 25–26, 26–27, and out through the open ends of the flow channels to the outlet 13 of the fractionator.

Now, if the drum is rotated, an increase in the flow distance occurs. Of course, such increase is depending on the rotational speed of the drum, since at a higher rotational speed two of the cylinder walls of the drum, between and along which flow takes place, have time to rotate a longer distance during the time a certain volume of suspension is present therebetween, i.e., during the passage from the inlet end of the drum to its outlet end. If, for instance, the rotational speed of the drum at a certain axial flow is such that a certain volume of particles has time to flow from the inlet end of the drum to its outlet end during one revolution, the flow distance equals the diagonal of the rectangle, one side of which is the axial length of the channel wall and the other side of which is the circumference of this channel wall (in case of coaxial cylinder walls) or the length of a spiral turn (in case of a spirally curved wall), respectively, i.e., longer than at one revolution of the known fractionator having a helical channel and longer than at stationary fractionator drum according to the present invention. Thus, the path of flow describes a screw line, the pitch of which decreases with increasing rotational speed, i.e., that the liquid volume has time to describe several revolutions relative to the channel wall during the passage from the inlet end of the drum to its outlet end at increasing rotational speed. Thus, the fractioning distance is most considerably increased and, accordingly, the degree of separation between particles of different sizes.

Since it has proven that relatively low rotational speeds and relatively high flows result in sufficient fractioning, fractioning drums having spirally curved wall can be used without any drawback, without any considerable radial displacement of a flow channel taking place due to the rotation of the drum.

Upon rotation of the drum in the direction indicated by arrows A in FIGS. 3 and 4, the surface of the suspension will be positioned approximately as shown in FIG. 4, i.e., with increasing raising and lowering, respectively, towards the outer drum circumference due to the relative speed between the liquid and the rotating channel walls increasing towards that drum circumference.

Thus, in each flow channel defined by two adjacent channel walls, a part ring of suspension having the cross sectional size of barely a half circle is moving from the inlet 32 towards the outlet end of the flow channel. In such a cross section, that may be compared to the previously mentioned suspension plug, a successive re-location of particles takes place during the flow, so that at the outlet end the largest particles are first in the cross section and the smallest last. Thus, the real fractioning is completed and the fractions could principly be taken care of by letting the flow fall freely down into two or more recipients for different fractions placed in a row after each other under the outlet end, e.g., as in the known fractionator.

It is preferred, however, to arrange the fraction outlets 13, 14 and 15 mentioned. For the sake of clearness, these are drawn also in FIG. 4 and are arranged such that the outlet 15 is located first and the outlet 14 last, as counted in the direction of rotation of the drum, and the outlet 13 between the former ones. Counted in the relative direction of flow of the suspension plug, the order is reversed. Thus, the largest particles are located in the region of the outlet 14, the medium-sized in the region of the outlet 13 and the finest particles in the region of the outlet 15.

As indicated in FIG. 1 in connection with the outlet 13, and in FIG. 2 in connection with all outlets, there are guide means 33, 34, 35, such as metal plate shields or the like, to guide fractions from defined sectors of the drum towards the outlets 13, 14 and 15. In FIG. 2 these sectors are located approximately in positions between 3 and 5 o'clock, between 5 and 7 o'clock, and between 7 and 9 o'clock. In order to adjust the flow through the drum and particularly the level therein, at least the outlet located at the lowest level is provided with non-shown regulating means.

It is realized that a drum having coaxial cylinder walls and a drum having spirally curved continuous wall do not differ in axial section. The end view of a drum having spirally curved continuous wall 36 is shown in FIG. 6 only for the sake of completeness and is shown for the sake of clarity to have only six spiral turns.

In FIG. 7 is shown the operational principle for a fractionator according to the present invention. In contrast to the known fractionator, in which the flow direction and the fractioning direction was one and the same, the flow here takes place in the axial direction of the drum, whereas the fractioning direction in a fractionator according to the present invention is a resultant of an axial flow direction and a relative flow direction depending on the rotation of the drum, the fractions occupying different angular positions in the circumferential direction of the drum as a result of rotation of the drum. In practical use and in operation with rotating drum, therefore, the fractioning direction becomes substantially perpendicular to the axial flow.

We claim:

1. A fractionator for continuously fractioning different fractions from a suspension, said fractionator comprising:

a housing having inlet means for the suspension and outlet means for the fractions;

a shaft;

a drum positioned within said housing and being rotatable on said shaft about a substantially horizontal axis;

said drum having an open inlet end and an open outlet end and including at least two fluid tight walls surrounding the axis and extending longitudinally substantially parallel thereto between said inlet end and said outlet end to define between said ends a fluid channel extending substantially parallel to said axis from said inlet end to said outlet end and continuously extending in a circumferential direction of said drum through an arc of at least 360°;

said outlet means comprising at least two outlets for fractions, said outlets positioned at different angular positions relative to said axis.

2. A fractionator according to claim 1, wherein said walls are coaxial and cylindrical.

3. A fractionator according to claim 1, wherein said walls are formed by adjacent turns of a spirally curved wall.

4. A fractionator according to claim 1, wherein all said walls are supported from said shaft only at said inlet end.

5. A fractionator according to claim 1, wherein only an inner one of said walls is supported at both ends by said shaft and remaining walls are supported only at said inlet end.

6. A fractionator according to claim 1, wherein said walls are supported at said inlet end by spokes radially extending from said shaft.

7. A fractionator according to claim 5, wherein said housing includes an upper part and a lower part, wherein said lower part is a trough for suspension.

8. A fractionator according to claim 1, wherein at least one of said at least two outlets is adjustable.

9. A fractionator according to claim 1, wherein said walls have an equal axial length.

10. A fractionator according to claim 6, wherein said fluid channel has a channel outlet end, which is spaced with little clearance from said at least two outlets.

* * * * *